Patented Dec. 18, 1945

2,391,015

UNITED STATES PATENT OFFICE 2,391,015

ALKALOID AND PROCESSES FOR PRODUCING THE SAME

Karl Folkers, Plainfield, N. J., and John Shavel, Jr., Glendale, Long Island, N. Y., assignors to Merck & Co., Inc., Rahway, N. J., a corporation of New Jersey No Drawing. Application April 9, 1941, Serial No. 387,654

8 Claims. (Cl. 260—236)

This invention relates to a new alkaloid from species of Erythrina, and to processes for producing it.

The alkaloids which applicants and their co-workers have produced for the first time from species of Erythrina cause, physiologically, a potent curare-like action, and certain of them have been found particularly useful for the release of spasms and plastic muscular rigidity in patients with spastic paralysis, and for the modification of the severity of the metrazol convulsions, thereby preventing fractures in the convulsive therapy of the psychoses.

Co-pending application Serial No. 343,854, filed July 3, 1940, discloses the production of certain "free," "combined," and "liberated" alkaloids from various species Erythrina.

In that application, it is disclosed that when seeds or parts of plants of Erythrina species are extracted with water, alcohol, etc. (after first having removed fats), a crude alkaloidal extract is obtained which exhibits a high paralysis potency. When this extract is made slightly alkaline, and is extracted with a solvent which is immiscible in water, such as chloroform, a crude active alkaloidal fraction is obtained which has curare-like action. This fraction has been called the "free" alkaloidal fraction, and from it a number of individual alkaloids have been isolated and identified, such as α- and β-erythroidine, erythramine, erythraline, and erythratine.

The "free" alkaloidal fraction may be obtained from the Erythrina species by either the "preferred" procedure (i. e., direct production of the "free" fraction) or by the "alternative" procedure (i. e., production of the "free" fraction after intermediate isolation of the known, physiologically inert alkaloid, hypaphorine). The "preferred" procedure comprises the following general steps, briefly described, particularly as applied to the seeds:

(1) Extraction of the seeds to remove fats.

(2) Extraction of the total alkaloids from the defatted seeds by treatment thereof with a solvent such as methyl or ethyl alcohol.

(3) Distillation of the alcohol solution to dryness and dissolving of the residue in water.

(4) Clarification of the aqueous solution by weakly acidifying and extracting with petroleum ether, and then with chloroform to remove traces of fats. This operation must be carried out carefully.

(5) Alkalinization of the clarified aqueous solutions with a weak alkalinizing agent.

(6) Extraction of the weakly or slightly alkalinized aqueous solution with chloroform which removes the "free" alkaloidal fraction.

In the examples given below, wherever we refer to the "preferred" method it is intended to indicate that the "free" alkaloidal fraction has been produced from the Erythrina seeds without prior separation of hypaphorine.

Certain variations may be practiced in carrying out this general process. Thus, for example:

(a) Step 1 may be omitted and the fats taken out at step 4 in the process. This is not entirely satisfactory because the mixture obtained is difficult to handle.

(b) The extraction at step 2 may be carried out with water, in which case step 3 may be omitted. However, this is not a preferred method because water extracts a large quantity of extraneous material and subsequent filtrations or solvent extractions are thus rendered more difficult.

(c) The alkaloid, hypaphorine, occurs in species of Erythrina and can be removed by acidifying the extract remaining after step 4, concentrating to a small volume, and refrigerating, whereupon the hypaphorine salt crystallizes out. The process wherein hypaphorine is removed before the "free" fraction, is called the "alternative" procedure.

In the examples given below, whenever we refer to the "alternative" procedure, it is intended to indicate that the "free" fraction has been produced from the Erythrina seeds after intermediate isolation of hypaphorine.

It was found, as disclosed in the co-pending application Serial No. 343,854, that the Erythrina seeds contain not only the "free" alkaloidal fraction, but also other alkaloids which have been called "combined" alkaloids because they are combined with an acid through an ester linkage. These new "combined" alkaloids appear to be esters of sulfo-acetic acid, $HO_3SCH_2CO_2H$, and new alkaloidal molecules. This is evidenced by the fact that acid or alkaline hydrolysis of the new "combined" alkaloids yields two components for each "combined" alkaloid, the sulfo-acetic acid, and the alkaloidal portion, which has been called the "liberated" alkaloid.

The said co-pending application discloses the production of the new individual "combined" alkaloids, erysothiovine and erysothiopine, as well as the new individual "liberated" alkaloids, erysodine, erysopine, erysovine, and erysocine.

We have now produced a new individual "liberated" alkaloid, erysonine, from the species E. costaricensis Micheli. Certain variations in botanical characteristics have been noted throughout the species E. costaricensis Micheli, and the amounts of our new alkaloid which may be obtained from different samples of the species will vary considerably.

The new "liberated" alkaloid has the empirical formula $C_{17}H_{19}NO_3$; it has one methoxy ($CH_3O-$) group, and does not have an N-methyl or C-methyl group. Since it is soluble in dilute sodium hydroxide, one oxygen atom presumably exists in a phenolic hydroxyl group, and the third oxygen atom is probably in a hydroxyl group also. The melting point of erysonine is difficult to obtain, because it melts with decomposition, and varies with the rate of heating the bath. The average melting point constant for erysonine, however, is in the range of 236–239° C.

$[\alpha]_D^{25} = +285-288°$, 0.5% aqueous hydrochloric acid;
$[\alpha]_D^{25} = +272$, morpholine.

Erysonine, in aqueous solution containing a slight excess of hydrochloric acid, has been found to cause the characteristic curare-like action when injected intralymphatically into frogs at a dose of 100 mg./kg. of frog (calculated as the salt).

The hydrolyzed or "liberated" bases obtained from the samples E. costaricensis Micheli may consist of the new "liberated" alkaloid erysonine, as well as certain of the other previously disclosed "liberated" alkaloids. In such case, appropriate repeated recrystallization of the total hydrolyzed bases from ethanol yields pure crystalline erysonine.

The following examples illustrate methods of carrying out the present invention on samples of E. costaricensis Micheli, but it is to be understood that these examples are given by way of illustration and not of limitation.

Example I

About 50 gms. of finely powdered seeds of E. costaricensis Micheli (Niehaus 9200) were extracted by the "alternative" procedure, for the isolation of the "free" alkaloidal fraction. The 50 ml. of neutralized aqueous solution remaining after the removal of the "free" fraction, was hydrolyzed by treatment with hydrochloric acid (pH 2–2.3) and refluxing for about one hour. The solution was cooled, and alkalinized with sodium bicarbonate. It was repeatedly extracted with chloroform. The chloroform residue of the hydrolysis weighed about 748 mg., and after trituration with 0.6 ml. of ethanol, about 358 mg. of bases of melting point about 180–235° were obtained. A negative color test for erysopine indicated that this "liberated" alkaloid was not present. The bases were recrystallized four times from ethanol, and 86 mg. of a product was obtained which, after the second recrystallization, had a constant melting point of about 241–243° C. with decomposition, and $[\alpha]_D^{25} = +289$, 0.5% aqueous hydrochloric acid. This decomposition point was later found to be in the range of 236–239° C., when a melting point determination was made on samples of this product and the product of Example 2, in the same melting point bath. We have given this new alkaloid the name erysonine. It does not give a green color with ferric chloride solution.

Example II

About 677 gms. of finely powdered seeds of E. costaricensis Micheli (Niehaus 9364) were extracted by the "preferred" procedure, for the production of the "free" alkaloidal fraction. The neutralized aqueous solution remaining (about 600 ml.) after the removal of the "free" fraction was hydrolyzed by three successive treatments with hydrochloric acid (pH 2–2.3), each hydrolysis lasting for about one hour. It was found that the "liberated" bases from the three hydrolyses each gave a positive color test indicating the presence of the individual "liberated" alkaloid, erysopine, and they were then combined. After trituration with warm ethanol, about 940 mg. of bases of melting point about 195–200° C. were obtained. One recrystallization of these bases from ethanol gave about 440 mg. (A) of melting point about 233–236° C., which gave a negative color test for erysopine. The mother liquor gave about 382 mg. of residue (B) of melting point about 183–185° C.

The product (A) was recrystallized five times from ethanol and gave a product of constant melting point after the second recrystallization.

As in the case of erysonine from the sample E costaricensis Micheli (Niehaus 9200) described in Example I, the melting point, with decomposition, of the product obtained was difficult to check, and its determination was always made against that of a sample from the previous crystallization. The average constants observed were melting point 236–239° C.;

$[\alpha]_D^{25} = +285-288°$, $l=1$, 0.2 to 0.5% alkaloid in 0.5% aqueous hydrochloric acid; $[\alpha]_D^{25} = +272$, $l=1$, about 0.5% alkaloid in morpholine. The decomposition point of erysonine from the sample E. costaricensis Micheli (Niehaus 9200) was in this range when compared with this sample from E. costaricensis Micheli (Niehaus 9364).

The soluble residue (B) was extracted with ether, and yielded about 210 mg. of insoluble material of melting point about 190–195° C., which was dissolved in 2% aqueous sodium hydroxide, and extracted ten times with chloroform. The solvent residue, of melting point about 198–200° C., was recrystallized from ethanol to yield the individual "liberated" alkaloid erysodine, of melting point 200–202° C., $[\alpha]_D^{25} = +245°$ (ethanol).

The base, erysonine, in aqueous solution, may be converted to its salts, by the addition of a slight excess of the appropriate acid, such as hydrochloric acid, hydrobromic acid, sulfuric acid, and the like.

Modifications may be made in carrying out the present invention without departing from the spirit and scope thereof, and we are to be limited only by the appended claims.

We claim:

1. A substance selected from the group consisting of the alkaloid erysonine, which is identical with the alkaloid, having the same characteristics obtained from a species of erythrina and which has the empirical formula $C_{17}H_{19}NO_3$ and in its substantially pure form has a melting point of about 236–239° and the constant $(\alpha)_D^{25} = +285-288°$ in 5% aqueous hydrochloric acid and $(\alpha)_D = +272°$ in morpholine, and salts of said alkaloid.

2. The alkaloid erysonine, identical with the alkaloid having the same characteristics obtained from a species of erythrina, which has the empirical formula $C_{17}H_{19}NO_3$, and which in its substantially pure form has a melting point of about 236–239° C., and the constant $[\alpha]_D^{25} = +285-$ 288° in 5% aqueous hydrochloric acid and $[\alpha]_D^{25}=+272°$, in morpholine.

3. Salts of the alkaloid erysonine, which is identical with the alkaloid erysonine obtained from species of Erythrina containing said alkaloid, has the empirical formula $C_{17}H_{19}NO_3$, and in its substantially pure form has a melting point of about 236–239° C., and the constant $[\alpha]_D^{25}=+285-288°$ in 0.5% aqueous hydrochloric acid and $[\alpha]_D^{25}=+270°$, in morpholine.

4. Hydrohalides of the alkaloid erysonine, which is identical with the alkaloid erysonine obtained from species of Erythrina containing said alkaloid, has the empirical formula $C_{17}H_{19}NO_3$, and in its substantially pure form has a melting point of about 236–239° C., and the constant $[\alpha]_D^{25}=+285-288°$ in 0.5% aqueous hydrochloric acid, and $[\alpha]_D^{25}=+272°$, in morpholine.

5. The hydrochloride of the alkaloid erysonine, which is identical with the alkaloid erysonine obtained from species of Erythrina containing said alkaloid, has the empirical formula $C_{17}H_{19}NO_3$, and in its substantially pure form has a melting point of about 236°–239° C., and the constant $[\alpha]_D^{25}=+285-288°$ in 0.5% aqueous hydrochloric acid and $[\alpha]_D^{25}=+272°$, in morpholine.

6. The hydrobromide of the alkaloid erysonine, which is identical with the alkaloid erysonine obtained from species of Erythrina containing said alkaloid, has the empirical formula $C_{17}H_{19}NO_3$, and in its substantially pure form has a melting point of about 236–239° C., and the constant $[\alpha]_D^{25}=+285-288°$ in 0.5% aqueous hydrochloric acid and $[\alpha]_D^{25}=+272°$, in morpholine.

7. The process comprising hydrolyzing the "combined" alkaloids of *E. costaricensis* Micheli, and repeatedly recrystallizing the "liberated" alkaloids thus produced, from ethanol, obtaining the individual "liberated" alkaloid erysonine which has the empirical formula $C_{17}H_{19}NO_3$, and in its substantially pure form has a melting point of about 236–239° C., and the constant $[\alpha]_D^{25}=+285-288°$ in 0.5% aqueous hydrochloric acid and $[\alpha]_D^{25}=+272°$, in morpholine.

8. The process comprising hydrolyzing in acid medium the "combined" alkaloids of *E. costaricensis* Micheli, and repeatedly recrystallizing the "liberated" alkaloids thus produced, from ethanol, obtaining the individual "liberated" alkaloid erysonine which has the empirical formula $C_{17}H_{19}NO_3$, and in its substantially pure form has a melting point of about 236–239° C., and the constant $[\alpha]_D^{25}=+285-288°$ in 0.5% aqueous hydrochloric acid and $[\alpha]_D^{25}=+272°$, in morpholine.

KARL FOLKERS.
JOHN SHAVEL, Jr.